(12) United States Patent
Yamamoto et al.

(10) Patent No.: US 10,090,915 B2
(45) Date of Patent: Oct. 2, 2018

(54) OPTICAL COMMUNICATION DEVICE AND OPTICAL COMMUNICATION METHOD

(71) Applicant: SONY CORPORATION, Tokyo (JP)

(72) Inventors: Masanari Yamamoto, Kanagawa (JP); Kazuaki Toba, Kanagawa (JP); Kazuyoshi Suzuki, Tokyo (JP); Kazumoto Kondo, Kanagawa (JP); Yasuhisa Nakajima, Kanagawa (JP); Satoshi Miyazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 102 days.

(21) Appl. No.: 15/121,862

(22) PCT Filed: Feb. 13, 2015

(86) PCT No.: PCT/JP2015/053946
§ 371 (c)(1),
(2) Date: Aug. 26, 2016

(87) PCT Pub. No.: WO2015/146348
PCT Pub. Date: Oct. 1, 2015

(65) Prior Publication Data
US 2017/0019169 A1  Jan. 19, 2017

(30) Foreign Application Priority Data
Mar. 27, 2014  (JP) ................. 2014-065813

(51) Int. Cl.
*H04B 10/25* (2013.01)
*H04B 10/073* (2013.01)

(52) U.S. Cl.
CPC .......... *H04B 10/073* (2013.01); *H04B 10/25* (2013.01)

(58) Field of Classification Search
CPC .... H04J 14/0227; H04J 3/0682; H04B 10/00; H04B 10/077; H04B 10/07955; H04B 10/073; H04B 10/25
See application file for complete search history.

(56) References Cited

FOREIGN PATENT DOCUMENTS

| JP | 06-232842 | 8/1994 |
| JP | 2003-264509 | 9/2003 |
| JP | 2010-028302 | 2/2010 |

*Primary Examiner* — Ted Wang
(74) *Attorney, Agent, or Firm* — Paratus Law Group, PLLC

(57) ABSTRACT

Light signal transmitter units 21-1 to 21-n of a transmitter device 20 perform optical communication with a receiver device 40 via optical fiber cables 61-1 to 61-n of an optical interface cable 61. A connection detection unit 22 detects whether connection to the receiver device is established via the optical interface cable, and a visible light source control unit 24 causes a visible light source unit 25 to emit visible light that can identify by an attribute a connection relationship with the receiver device connected via the optical interface cable, only when the connection to the receiver device 40 is not detected, and causes visible light superposition units 26-1 to 26-n to superpose the visible light on the cable. The receiver device also superposes on the cable the visible light that can identify by the attribute the connection relationship with the transmitter device connected via the optical interface cable, only when the connection to the transmitter device 20 is not established, in the same way as the transmitter device. The connection between the optical communication devices can be correctly and easily performed by using the optical transmission path.

12 Claims, 8 Drawing Sheets

OPTICAL COMMUNICATION DEVICE AND OPTICAL COMMUNICATION METHOD

CROSS REFERENCE TO PRIOR APPLICATION

This application is a National Stage Patent Application of PCT International Patent Application No. PCT/JP2015/053946 (filed on Feb. 13, 2015) under 35 U.S.C. § 371, which claims priority to Japanese Patent Application No. 2014-065813 (filed on Mar. 27, 2014), which are all hereby incorporated by reference in their entirety.

TECHNICAL FIELD

This technology relates to an optical communication device and an optical communication method, and correctly and easily performs connection between optical communication devices by using an optical transmission path.

BACKGROUND ART

In the past, in line connection work such as installation and reconnection of an electronic device or the like, it is not clearly specified on a cable which connector is to be connected to, and thus it is necessary to perform connection after confirming the connector of the device to which the cable is connected at each time. Thus, the line connection work is very cumbersome, and causes improper connection easily, and is inconvenient.

Also, as video becomes super high definition in the recent years, data capacity transmitted between devices dramatically has increased, and it is envisaged that interface between devices changes from electric transmission to optical transmission. In an optical transmission method, a transmittable distance dramatically becomes longer than existing electrical connection even in high speed transmission, and thus it is concerned that connection work between the devices becomes more complex and difficult.

In the optical transmission method, it is proposed to identify whether or not a light signal is transmitted to an optical fiber, by superposing visible light, in a light signal transmission device, as in Patent Literature 1 for example.

CITATION LIST

Patent Literature

Patent Literature 1: JP H6-232842A

SUMMARY OF INVENTION

Technical Problem

In the meantime, in the method that superposes the visible light on the light signal, it can be confirmed visually whether the light signal is transmitted between the devices during the connection work. However, when a plurality of connectors are provided in the device or when a plurality of optical fiber cables are used to connect between the devices, it is not easy to correctly connect the connectors to the optical fiber cables. Also, when the devices are away, it is impossible to visually confirm the connected state between the devices, and thus it becomes more difficult to correctly connect the connectors to the optical fiber cables. Further, if the optical fiber cable is provided with a label or the like to make it identifiable which connector of which device the optical fiber cable is connected to, the connection between the devices can be performed correctly. However, work for providing the label or the like on the optical fiber cable and work such as replacement of the label when the connector to connect is changed becomes necessary, and thus management of the optical fiber cable becomes cumbersome.

Thus, in this technology, a purpose is to provide an optical communication device and an optical communication method that correctly and easily perform connection between the optical communication devices by using an optical transmission path.

Solution to Problem

A first aspect of the present technology is an optical communication device including: a communication unit configured to perform optical communication with a communication target via an optical transmission path; a connection detection unit configured to detect connection between the communication unit and the communication target via the optical transmission path and generate detection information; a visible light source unit configured to emit visible light; a visible light superposition unit configured to superpose the visible light emitted from the visible light source unit on the optical transmission path; and a visible light source control unit configured to cause the visible light source unit to emit the visible light that makes identifiable, by an attribute, a connection relationship with the communication target that is connected via the optical transmission path, only when connection to the communication target is not detected on the basis of the detection information generated by the connection detection unit.

In this technology, optical communication with a communication target is performed via an optical transmission path by a communication unit. In a connection detection unit, connection to the communication target via the optical transmission path or a transmission path that differs from the optical transmission path is detected to generate detection information.

Only when connection to the communication target is not detected on the basis of the detection information generated by the connection detection unit, a visible light source control unit emits, from a visible light source unit, visible light that makes identifiable, by its attribute, a connection relationship with the communication target that is connected via the optical transmission path. For example, there is provided a function display portion that makes a function of the communication unit identifiable in the vicinity of the connector for connecting the optical transmission path with the communication unit. Here, when the function of the communication unit is a transmission function of the light signal, the visible light source control unit emits, from the visible light source unit, visible light which is non-laser light of a color that is the same as a display color of the function display portion indicating a reception function of the light signal. Also, when the function of the communication unit is the reception function of the light signal, the visible light source control unit emits, from the visible light source unit, visible light which is non-laser light of a color that is the same as a display color of the function display portion indicating the transmission function of the light signal. Also, the visible light source control unit may emit, from the visible light source unit, visible light that makes identifiable a connection relationship with the communication target that is connected via the optical transmission path, by a light emission pattern or the like.

Also, when the connection to the communication target changes from a connected state to an unconnected state, the visible light source control unit emits visible light from the visible light source unit, to make it identifiable that the connection has changed from the connected state to the unconnected state. For example, the visible light source control unit lights up the visible light before connection and thereafter turns off the visible light after connection. Further, when becoming the unconnected state after the connection, the visible light is blinked to make it identifiable that the connection has changed from the connected state to the unconnected state. Also, when a plurality of communication units are provided, and the connection of a plurality of communication units is performed together by the connector, the visible light source control unit superposes the visible light on the transmission path used in the optical communication of at least any of communication units of a plurality of communication units connected by the connector, or all transmission paths used in the optical communication of a plurality of communication units.

A second aspect of the present technology is an optical communication method including: a step of detecting, by a connection detection unit, connection between a communication unit that performs optical communication and a communication target via an optical transmission path, and generating detection information; and a step of causing, by a visible light source control unit, a visible light source unit to emit visible light that makes identifiable, by an attribute, a connection relationship with the communication target that is connected via the optical transmission path, only when the connection to the communication target is not detected on the basis of the detection information, and causing a visible light superposition unit to superpose the visible light on the optical transmission path.

Advantageous Effects of Invention

According to this technology, the connection detection unit detects the connection between the communication unit that performs the optical communication and the communication target via the optical transmission path. The visible light source control unit emits, from the visible light source unit, the visible light that makes identifiable, by the attribute, the connection relationship with the communication target that is connected via the optical transmission path, only when it is not detected that the communication unit is connected to the communication target on the basis of the detection information indicating this detection result. The visible light emitted from the visible light source unit is superposed on the optical transmission path by the visible light superposition unit. Thus, the connection between the optical communication devices can be performed correctly and easily, by referring to the visible light superposed on the optical transmission path. Note that the effects described in the present specification are just examples and are not limitative, and there may be additional effects.

DESCRIPTION OF EMBODIMENT(S)

In the following, a mode for carrying out the present technology will be described. Note that, description will be made in the following order.
1. With Respect to Optical Communication System
2. First Embodiment
2-1. Configuration of First Embodiment
2-2. Operation of First Embodiment
3. Second Embodiment
3-1. Configuration of Second Embodiment
3-2. Operation of Second Embodiment
3-3. Another Configuration and Operation of Second Embodiment
4. Another Embodiment
<1. With Respect to Optical Communication System>

Figure 1:
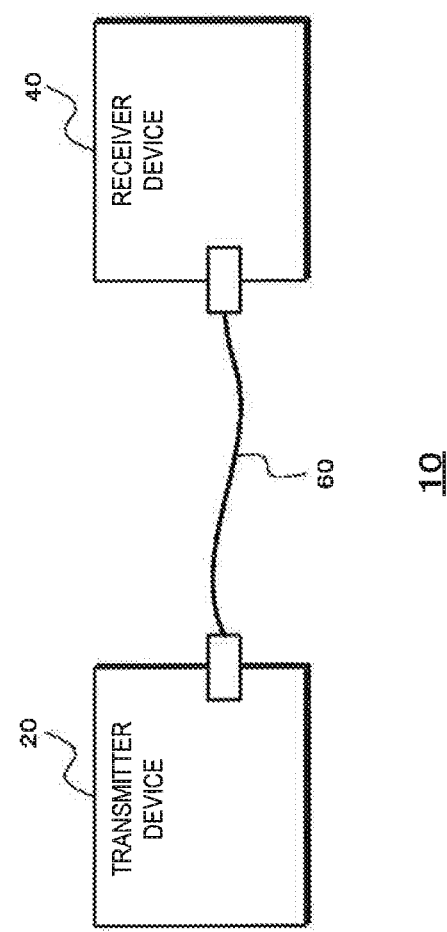
FIG. 1 is a diagram illustrating a configuration of an optical communication system.

FIG. 1 illustrates a configuration of an optical communication system. In the optical communication system 10, a transmitter device 20 and a receiver device 40 are connected via an optical transmission path 60.

The transmitter device 20 is a device that outputs, as a light signal, information such as video and audio content data, computer data, and data transmitted via a network, and the receiver device 40 receives the light signal to perform outputting of video and audio, processing of the information, and recording into a recording medium, for example.

Only when connection of the transmitter device 20 and the receiver device 40 is not detected, the transmitter device 20 and the receiver device 40 superpose, on the optical transmission path 60, visible light that makes identifiable, by an attribute, a connection relationship between the transmitter device 20 and the receiver device 40 that are connected via the optical transmission path 60.
<2. First Embodiment>

The first embodiment illustrates a case in which whether or not the transmitter device 20 and the receiver device 40 are connected via the optical transmission path is detected without utilizing the optical transmission path, and the visible light is superposed on the optical transmission path on the basis of a detection result.
<2-1. Configuration of First Embodiment>

Figure 2:
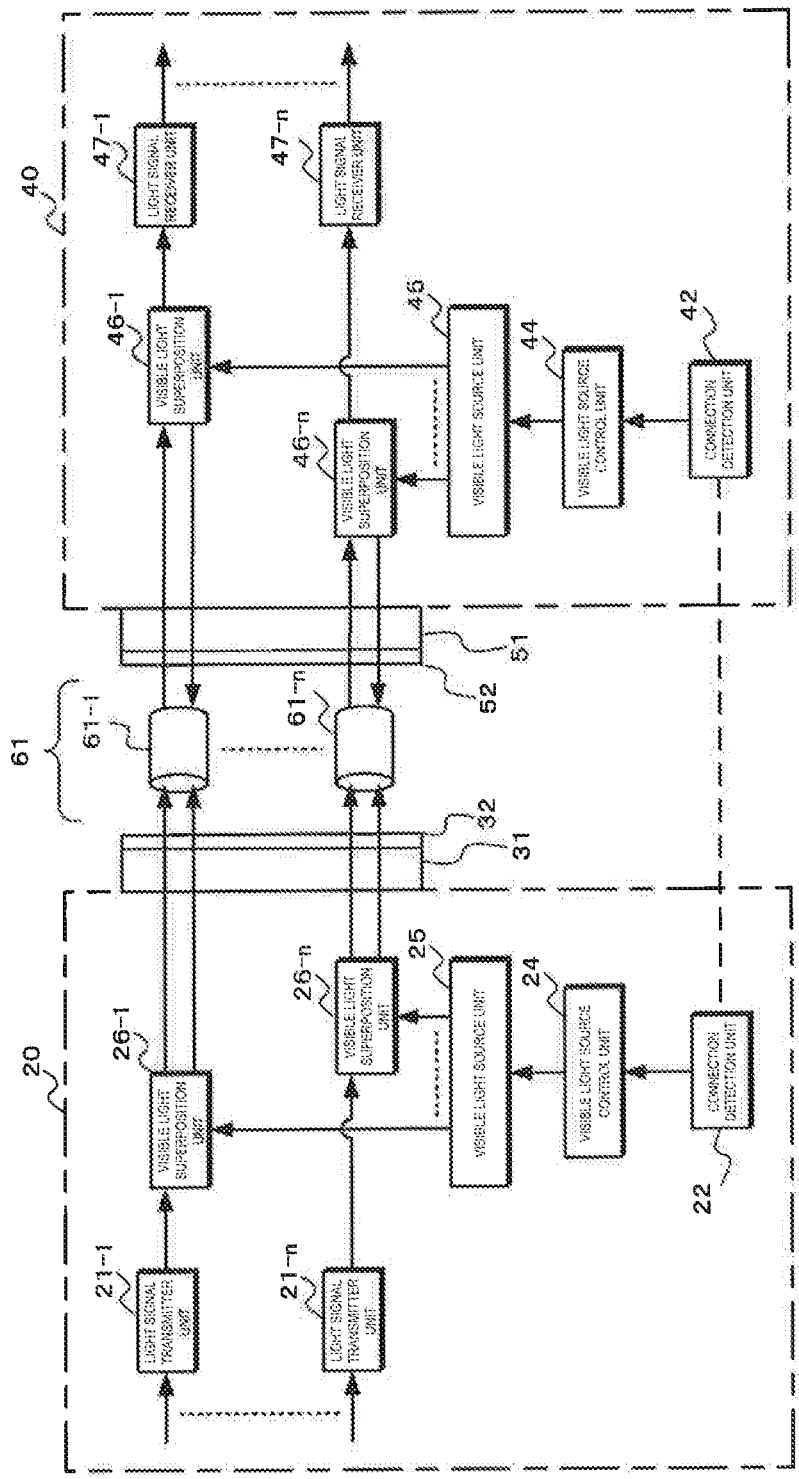
FIG. 2 is a diagram illustrating a configuration of a first embodiment.

FIG. 2 illustrates a configuration of the first embodiment. Note that FIG. 2 illustrates blocks relevant to a process that uses the optical transmission path, in the transmitter device 20 and the receiver device 40. Also, in an illustrated case, the transmitter device 20 and the receiver device 40 use, as the optical transmission path, an optical interface cable in which n lines of optical fiber cables 61-1 to 61-n are bundled into one, and optical connectors are provided at cable end portions, for example.

The transmitter device 20 includes light signal transmitter units 21-1 to 21-n, a connection detection unit 22, a visible light source control unit 24, a visible light source unit 25, visible light superposition units 26-1 to 26-n, an optical connector 31, and a function display portion 32.

The light signal transmitter unit 21-1 generates a light signal on the basis of transmission data and outputs the light signal to the visible light superposition unit 26-1. In the same way, the light signal transmitter units 21-2 to 21-n generate a light signal on the basis of the transmission data and output the light signal to the visible light superposition units 26-2 to 26-n.

The connection detection unit 22 detects whether the transmitter device 20 and the receiver device 40 are connected via the optical interface cable 61. The connection detection unit 22 performs communication with the receiver device 40 via a wired transmission path or a wireless transmission path that uses a transmission path, for example a metal cable or the like, which differs from the optical transmission path, that is, the optical fiber cables of the optical interface cable 61, and acquires connection information indicating a connection situation of the optical interface cable 61 in the receiver device 40. Also, the connection detection unit 22 determines the connection situation of the optical interface cable 61 in the transmitter device 20, and detects whether the transmitter device 20 and the receiver device 40 are connected via the optical interface cable 61, on the basis of this determination result and the connection information that is acquired from the receiver device 40. The connection detection unit 22 outputs detection information indicating the detection result to the visible light source control unit 24. Note that, when the connection information is acquired via the wired transmission path or the wireless transmission path provided separately from the optical interface cable, the connection information is generated on the basis of the determination result of whether or not the optical connector of the optical interface cable is coupled to the optical connector of the receiver device, for example. Also, the wired transmission path that uses a metal cable or the like may be provided separately from the optical interface cable 61, and the optical interface cable 61 may be configured with the wired transmission path that uses the optical fiber cable, the metal cable, or the like.

The visible light source control unit 24 generates a visible light source control signal on the basis of the detection information from the connection detection unit 22, and outputs the visible light source control signal to the visible light source unit 25. The visible light source control unit 24 determines the connection to the receiver device 40 via the optical interface cable 61 on the basis of the detection information, and when not connected to the receiver device 40, generates the visible light source control signal in such a manner that the visible light that makes identifiable, by the attribute, the connection relationship with the receiver device 40 connected via the optical interface cable 61 is emitted from the visible light source unit 25.

The visible light source unit 25 emits the visible light that makes the connection relationship identifiable by the attribute, to the visible light superposition unit provided corresponding to the optical interface cable that is determined to be unconnected, on the basis of the visible light source control signal. For example, the visible light source unit 25 emits the visible light of a color that is the same as the color set in the function of the receiver device 40 connected via the determined optical interface cable 61.

The visible light superposition unit 26-1 is connected to the optical connector (for example, a receptacle) 31. The visible light superposition unit 26-1 superposes the visible light emitted from the visible light source unit 25, on the optical fiber cable 61-1 that is used in the transmission of the light signal generated by the light signal transmitter unit 21-1. In the same way, the visible light superposition units 26-2 to 26-n superpose the visible light emitted from the visible light source unit 25, on the optical fiber cables 61-2 to 61-n that are used in the transmission of the light signal generated by the light signal transmitter units 21-2 to 21-n.

The optical connector 31 is connected to an optical connector (not illustrated in the drawings, and for example a plug) of the optical interface cable. The optical connector 31 causes the light signal from the visible light superposition unit 26-1 to enter into the optical fiber cable 61-1. In the same way, the optical connector 31 causes the light signal from the visible light superposition units 26-2 to 26-n to enter into the optical fiber cables 61-2 to 61-n.

The function display portion 32 presents a display that makes identifiable the light communication function performed via the optical connector 31. For example, the function display portion 32 is provided in the vicinity position of the optical connector 31, and presents color display indicating that the optical connector 31 is a connector that has a transmission function.

The receiver device 40 includes a connection detection unit 42, a visible light source control unit 44, a visible light source unit 45, visible light superposition units 46-1 to 46-n, light signal receiver units 47-1 to 47-n, an optical connector 51, and a function display portion 52.

The connection detection unit 42 detects whether the transmitter device 20 and the receiver device 40 are connected via the optical interface cable 61. The connection detection unit 42 performs communication with the transmitter device 20 via the wired transmission path or the wireless transmission path that uses the transmission path, for example the metal cable or the like, which differs from the optical transmission path, that is, the optical fiber cable of the optical interface cable 61, and acquires the connection information indicating the connection situation of the optical interface cable 61 in the transmitter device 20. Also, the connection detection unit 42 determines the connection situation of the optical interface cable 61 in the receiver device 40, and detects whether the transmitter device 20 and the receiver device 40 are connected via the optical interface cable 61, on the basis of this determination result and the connection information that is acquired from the transmitter device 20. The connection detection unit 42 outputs the detection information indicating the detection result, to the visible light source control unit 44. Note that, when the connection information is acquired via the wired transmission path or the wireless transmission path provided separately from the optical interface cable, the connection information is generated on the basis of the determination result of whether or not the optical connector of the optical interface cable is coupled to the optical connector of the transmitter device, for example. Also, the wired transmission path that uses a metal cable or the like may be provided separately from the optical interface cable 61, and the optical interface cable 61 may be configured with the wired transmission path that uses the optical fiber cable, the metal cable, or the like.

The visible light source control unit 44 generates the visible light source control signal on the basis of the detection information from the connection detection unit 42, and outputs the visible light source control signal to the visible light source unit 45. The visible light source control unit 44 determines the optical interface cable that is not connected to the transmitter device 20 on the basis of the detection information, and emits, from the visible light source unit 45, the visible light that makes identifiable, by the attribute, the connection relationship with the transmitter device 20 that is connected via this determined optical interface cable.

The visible light source unit 45 emits the visible light that makes the connection relationship identifiable by the attribute, to the visible light superposition unit provided corresponding to the optical interface cable that is determined to be unconnected, on the basis of the visible light source control signal. For example, the visible light source unit 45 emits the visible light of the color that is the same as the color set in the function of the transmitter device 20 connected via the determined optical interface cable.

The visible light superposition unit 46-1 superposes the visible light emitted from the visible light source unit 45, on the optical fiber cable 61-1 that is used in the transmission of the light signal that is received by the light signal receiver unit 47-1. In the same way, the visible light superposition units 46-2 to 46-n superpose the visible light emitted from the visible light source unit 45, on the optical fiber cables 61-2 to 61-n that are used in the transmission of the light signals that are received by the light signal receiver units 47-2 to 47-n.

The light signal receiver unit 47-1 performs a photoelectric conversion process or the like to the light signal from the visible light superposition unit 46-1, and generates reception data. In the same way, the light signal receiver units 47-2 to 47-n perform the photoelectric conversion process or the like to the light signals from the visible light superposition units 46-2 to 46-n, and generate reception data.

The optical connector (for example, a receptacle) 51 is connected to the optical connector (not illustrated in the drawings, and for example a plug) provided in the optical interface cable 61. The optical connector 51 emits the light signal from the optical fiber cable 61-1, to the visible light superposition unit 46-1. In the same way, the optical connector 51 emits the light signals from the optical fiber cables 61-2 to 61-n, to the visible light superposition units 46-2 to 46-n.

The function display portion 52 presents a display that makes identifiable the light communication function performed via the optical connector 51. For example, the function display portion 52 is provided in the vicinity position of the optical connector 51, and presents a color display indicating that the optical connector 51 is a connector that has a reception function.

<2-2. Operation of First Embodiment>

Figure 3:
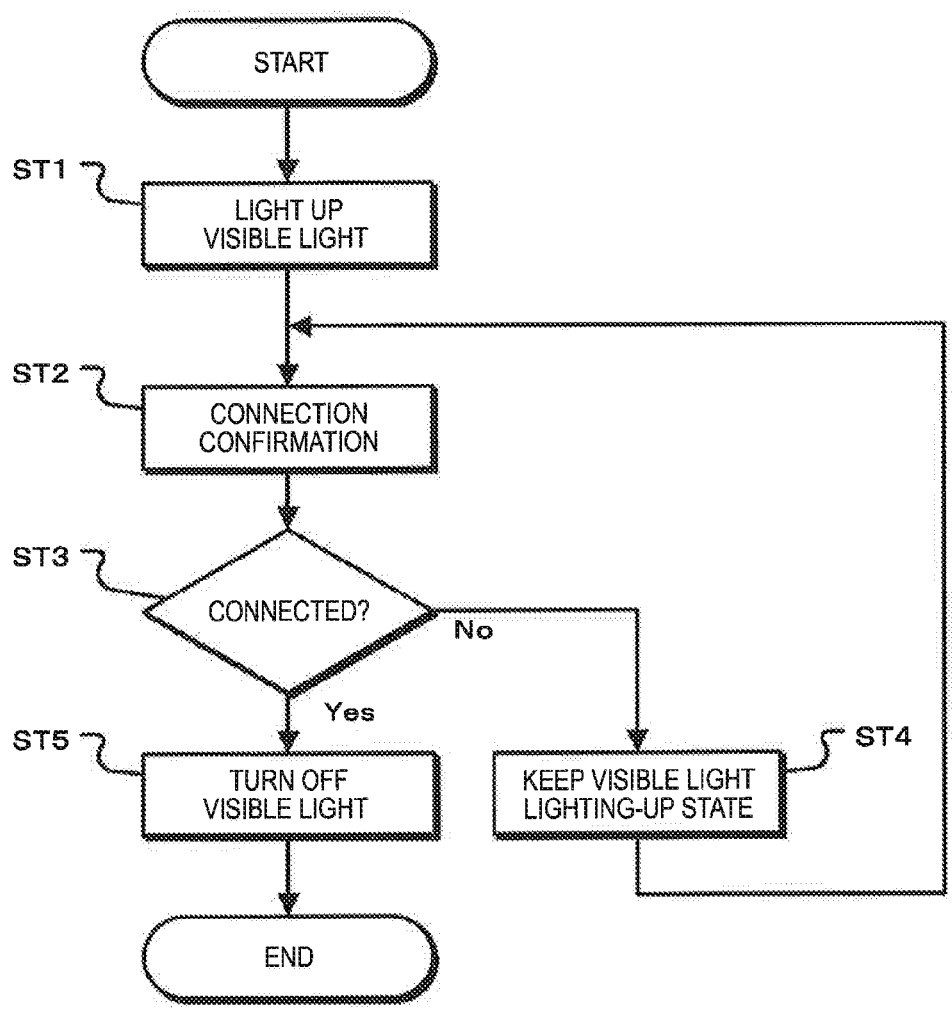
FIG. 3 is a flowchart illustrating operation of a visible light source control unit in the first embodiment.

Next, the operation of the first embodiment will be described. FIG. 3 is a flowchart illustrating the operation of the visible light source control unit in the first embodiment.

In step ST1, the visible light source control unit 24 lights up the visible light. For example, the visible light source control unit 24 controls the visible light source unit 25, and emits the visible light of the color that is the same as the color set in the function of the receiver device 40 connected via the optical interface cable 61, to the visible light superposition units 26-1 to 26-n, and proceeds to step ST2.

In step ST2, the visible light source control unit 24 performs connection confirmation. The connection detection unit 22 detects whether the transmitter device 20 and the receiver device 40 are connected via the optical interface cable 61 by the communication via the transmission path that differs from the optical transmission path, and generates the detection information indicating the detection result. The visible light source control unit 24 confirms whether or not the connection to the receiver device 40 is established, on the basis of the detection information generated by the connection detection unit 22, and proceeds to step ST3.

In step ST3, the visible light source control unit 24 determines whether the receiver device 40 is connected. The visible light source control unit 24 proceeds to step ST4 if the connection to the receiver device 40 is not confirmed, and proceeds to step ST5 if the connection to the receiver device 40 is confirmed.

In step ST4, the visible light source control unit 24 keeps a visible light lighting-up state. The visible light source control unit 24 continues the emission of the visible light and returns to step ST2, because the receiver device 40 is not connected via the optical interface cable 61.

In step ST5, the visible light source control unit 24 turns off the visible light. The visible light source control unit 24 controls the visible light source unit 25 to end the emission of the visible light.

As described above, the visible light source control unit 24 superposes the visible light in the state that is not connected via the optical interface cable, and ends the superposition of the visible light in the connected state. Further, the visible light source control unit 44 of the receiver device 40 performs a process that is the same as the visible light source control unit 24 of the transmitter device 20, and superposes the visible light of the color that is the same as the color set in the function of the transmitter device 20 connected via the optical interface cable, on the optical interface cable.

When this process is performed, if the transmitter device 20 and the receiver device 40 are not connected via the optical interface cable 61, the color of the visible light that is superposed on the optical transmission path by the transmitter device 20 is set to the color of the function display portion corresponding to the connector of the receiver device that connects this optical interface cable 61.

Figure 4:
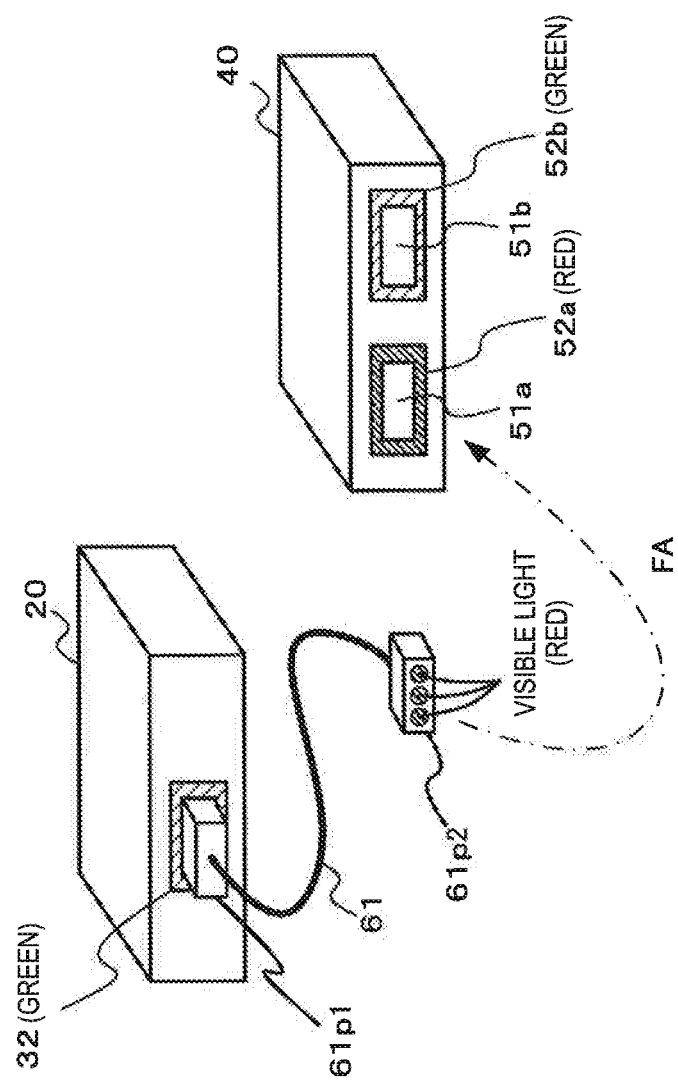
FIG. 4 is a diagram illustrating an operating state before connection of a transmitter device and a receiver device.

FIG. 4 illustrates an operating state before the connection of the transmitter device and the receiver device. The function display portion 32 is provided at the vicinity position of the optical connector of a light signal transmission side of the transmitter device 20, and the function display portion 32 is set to a green display, for example. Note that FIG. 4 illustrates a case in which one of the optical connectors (the plugs) 61$p$1 of the optical interface cable 61 is connected to the optical connector (the receptacle) of the transmitter device 20, and the other of the optical connectors (the plugs) 61$p$2 is in an unconnected state.

The function display portion 52*a* is provided at the vicinity position of the optical connector 51*a* of the receiver device 40, and the function display portion 52*b* is provided at the vicinity position of the optical connector 51*b*. The optical connector 51*a* is set to a light signal reception side, and the function display portion 52*a* is set to a red display, for example. Also, the optical connector 51*b* is set to a light signal transmission side, and the function display portion 52*b* is set to a green display, for example.

When the transmitter device 20 is not connected to the receiver device 40, the transmitter device 20 superposes, on the optical interface cable 61, the visible light of the color of the function display portion 52*a* corresponding to the optical connector 51*a* of the receiver device 40 to which the optical interface cable 61 is connected, that is, the visible light of red. Hence, the visible light of red is emitted from the other optical connector (the plug) 61$p$2 of the optical interface cable 61 connected to the transmitter device 20. Thus, the other optical connector (the plug) 61$p$2 of the optical interface cable 61 is connected to the optical connector 51*a* of the function display portion 52*a* whose color is identical with the visible light emitted from the optical connector as illustrated by an arrow FA, the transmitter device 20 and the receiver device 40 can be connected correctly.

As described above, according to the first embodiment, when not connected to the device of the connection destination via the optical transmission path, the visible light that makes identifiable, by the attribute, the connection relationship with the device of the connection destination is emitted from the optical connector. Thus, when the optical connector of the transmitter device 20 and the receiver device 40 and the optical connector of the device of the connection destination corresponding to the function display portion of the color that is the same as the visible light from this optical connector are connected by the optical transmission path, the device can be connected easily and correctly even when the transmitter device 20 and the receiver device 40 are away from each other.

Also, anybody can simply perform connection work without improper connection, only by connecting the optical connector corresponding to the function display portion whose color is identical in the other device, with the color of the visible light superposed by one of the devices.

Also, the visible light is turned off when the transmitter device 20 and the receiver device 40 are connected, and thus the visible light is not superposed in any case on the optical transmission path to which the transmitter device 20 and the receiver device 40 are connected. Thus, when the optical communication is performed between the transmitter device 20 and the receiver device 40, bad influence of optical transmission performance due to the superposed visible light is eliminated, and intended transmission performance can be ensured.

Also, when the transmitter device 20 and the receiver device 40 are in the unconnected state, the visible light is emitted, and thus a factor of failure for connection can be discovered easily before the connection. For example, even when the power supply of the device is set to an ON state, if the visible light is not emitted from the optical connector, operation failure of the device, the optical connector, or the like can be discovered easily before connection, and if the visible light is not emitted from the optical transmission path that is connected to the device, poor connection of the optical connector, disconnection of the optical transmission path, or the like can be discovered easily before connection. Further, the visible light is emitted from the optical connector of the device and the optical connector of the optical transmission path connected to the device, and thus even when connection of the device is performed in a dark environment, the position of the optical connector of the optical transmission path and the optical connector of the device can be visually confirmed easily, and therefore workability is improved.

Further, when the laser light is emitted as the visible light, the laser light emitted from the optical connector of the device and the optical transmission path enters into an eyeball of a nearby person, and it is concerned that unnecessary bad influence is given to a visual perception function or the like, depending on condition such as the light intensity of the laser light. Thus, the visible light emitted from the optical connector is prevented from giving the bad influence to the visual perception function or the like, by emitting non-laser light from the visible light source units 25, 45. Also, the visible light is diffused and emitted from the optical connector, by using the non-laser light, and thus color confirmation or the like can be performed easily.

Figure 5:
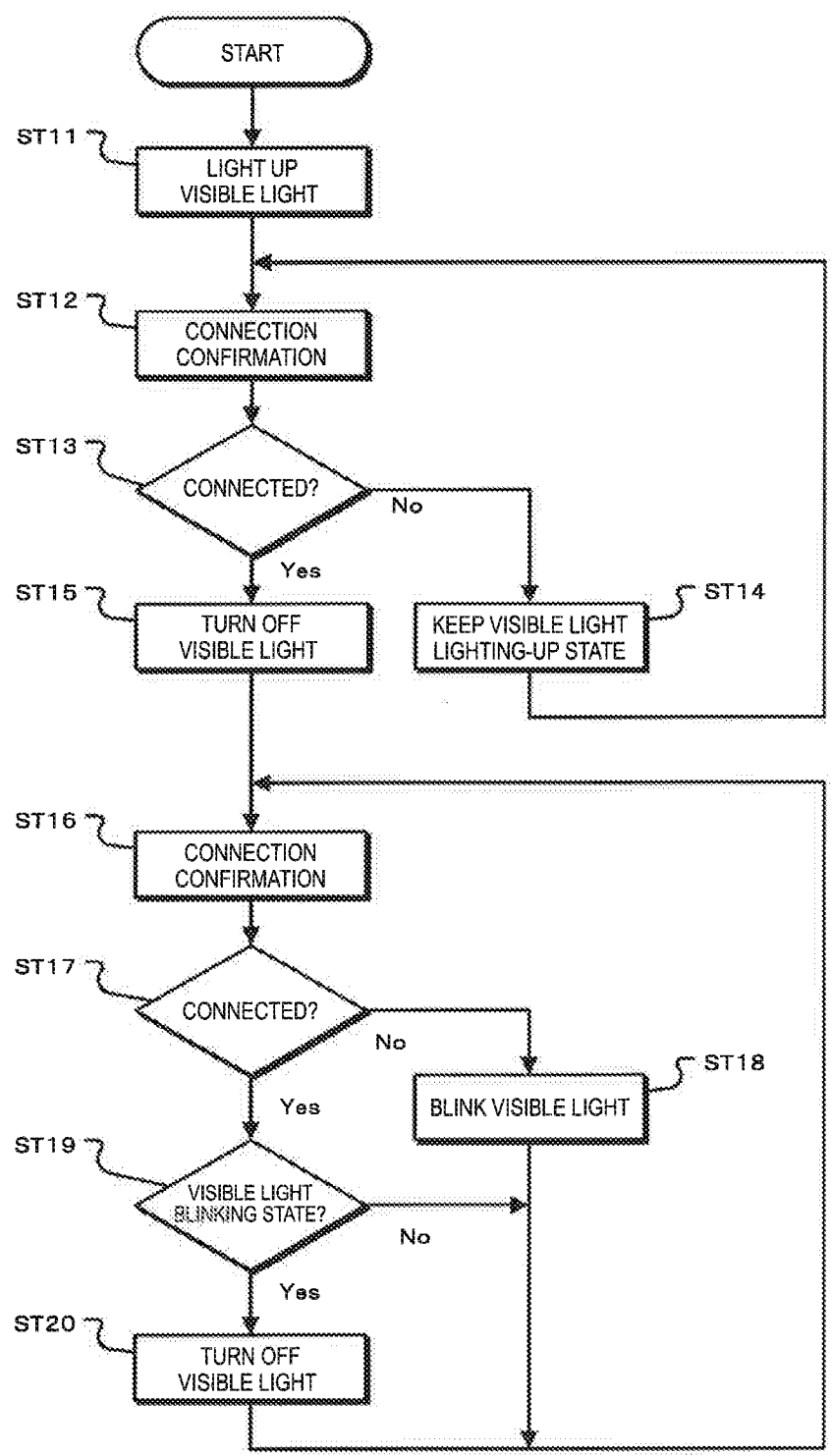
FIG. 5 is a flowchart illustrating another operation of a visible light source control unit in the first embodiment.

In the meantime, after the transmitter device 20 and the receiver device 40 are connected, the optical transmission path erroneously comes off due to incorrect operation, movement of the device, or the like, in some cases. Thus, operation for easily correctly connecting the optical transmission path again even when the optical transmission path comes off after the connection between the devices will be described as another operation of the first embodiment. FIG. 5 is a flowchart illustrating another operation of the visible light source control unit in the first embodiment.

In step ST11, the visible light source control unit 24 lights up the visible light. For example, the visible light source control unit 24 controls the visible light source unit 25, and emits the visible light of the color that is the same as the color set in the function of the receiver device 40 connected via the optical interface cable 61, to the visible light superposition units 26-1 to 26-n, and proceeds to step ST12.

In step ST12, the visible light source control unit 24 performs connection confirmation. The connection detection unit 22 detects whether the transmitter device 20 and the receiver device 40 are connected via the optical transmission path by the communication via the transmission path that differs from the optical transmission path, and generates detection information indicating the detection result.

The visible light source control unit 24 confirms whether or not the connection to the receiver device 40 is established, on the basis of the detection information generated by the connection detection unit 22, and proceeds to step ST13.

In step ST13, the visible light source control unit 24 determines whether the receiver device 40 is connected. The visible light source control unit 24 proceeds to step ST14 if the connection to the receiver device 40 is not confirmed, and proceeds to step ST15 if the connection to the receiver device 40 is confirmed.

In step ST14, the visible light source control unit 24 keeps a visible light lighting-up state. Because the receiver device 40 is not connected via the optical interface cable 61 that is used in the transmission of the light signal generated by the light signal transmitter unit 21-1, the visible light source control unit 24 continues emission of the visible light and returns to step ST12.

In step ST15, the visible light source control unit 24 turns off the visible light. The visible light source control unit 24 controls the visible light source unit 25 to end the emission of the visible light, and proceeds to step ST16.

In step ST16, the visible light source control unit 24 performs connection confirmation. The visible light source control unit 24 confirms whether or not the connection to the receiver device 40 is established, on the basis of the detection information generated by the connection detection unit 22, in the same way as step ST12, and proceeds to step ST17.

In step ST17, the visible light source control unit 24 determines whether the receiver device 40 is connected. The visible light source control unit 24 proceeds to step ST18 if the connection to the receiver device 40 is not confirmed, and proceeds to step ST19 if the connection to the receiver device 40 is confirmed.

In step ST18, the visible light source control unit 24 blinks the visible light. Because the receiver device 40 connected via the optical interface cable 61 becomes the unconnected state, the visible light source control unit 24 emits the visible light of the color that is the same as the color set in the function of the receiver device 40 that is connected via the optical interface cable 61, from the visible light source unit 25. Also, the visible light source control unit 24 sets the emitted visible light in a blinking state or sets in a blinking state for a predetermined period and thereafter in a continuously lighting-up state, in order to make occurrence of abnormality recognizable, and returns to step ST16.

In step ST19, the visible light source control unit 24 determines whether the visible light is in the blinking state or the subsequent continuously lighting-up state. The visible light source control unit 24 returns to step ST16 if the visible light is not any of the blinking state and the continuously lighting-up state, and proceeds to step ST20 if the visible light is in the blinking state or the subsequent continuously lighting-up state.

In step ST20, the visible light source control unit 24 turns off the visible light. The visible light source control unit 24 controls the visible light source unit 25 to end the emission of the visible light, and returns to step ST16.

Also, the visible light source control unit 44 of the receiver device 40 performs the process that is the same as the visible light source control unit 24 of the transmitter device 20, and superposes the visible light of the color that is the same as the color set in the function of the transmitter device 20 connected via the optical interface cable, on the optical interface cable.

When this process is performed, if the transmitter device 20 and the receiver device 40 change from the connected state to the unconnected state, the visible light of the color according to the function of the connection destination is emitted, and thus the optical transmission path that has become the unconnected state can be returned to the connected state correctly with reference to the color of the emitted visible light. Also, the visible light is in the blinking state, and thus the optical connector and the optical interface cable that have become the unconnected state can be recognized easily, and therefore reconnection is performed simply.

Note that the optical transmission path of the first embodiment may be any of unidirectional communication or bidirectional communication. Also, when the optical transmission path is the optical interface cable that is configured by using a plurality of lines of optical fiber cables as illustrated in FIG. 4, only if the optical connector is in the unconnected state, the visible light is superposed on the optical fiber cable that is used in the optical communication of the communication unit of at least any of a plurality of communication units connected by the optical connector. In this way, the transmitter device 20 and the receiver device 40 can be connected easily and correctly by the optical transmission path. Also, when the visible light is superposed on all optical fiber cables used in the optical communication of a plurality of communication units connected by the optical connector, the optical fiber cable in which poor connection and disconnection arise can be detected easily at each connector before connection. Further, the optical transmission path is not limited to the optical interface cable configured by using a plurality of lines of optical fiber cables, but may be an optical interface cable configured with one line of optical fiber cable. Also, the optical transmission path is not limited to one optical interface cable, but a plurality of optical interface cables may be used. Also, the optical transmission path is not limited to the optical interface cable, but may use an optical waveguide or the like.

<3. Second Embodiment>

Next, a second embodiment illustrates a case in which whether or not the transmitter device 20 and the receiver device 40 are connected via the optical transmission path is detected by utilizing this optical transmission path, and the visible light is superposed on the optical transmission path on the basis of the detection result with respect to this optical transmission path.

<3-1. Configuration of Second Embodiment>

Figure 6:
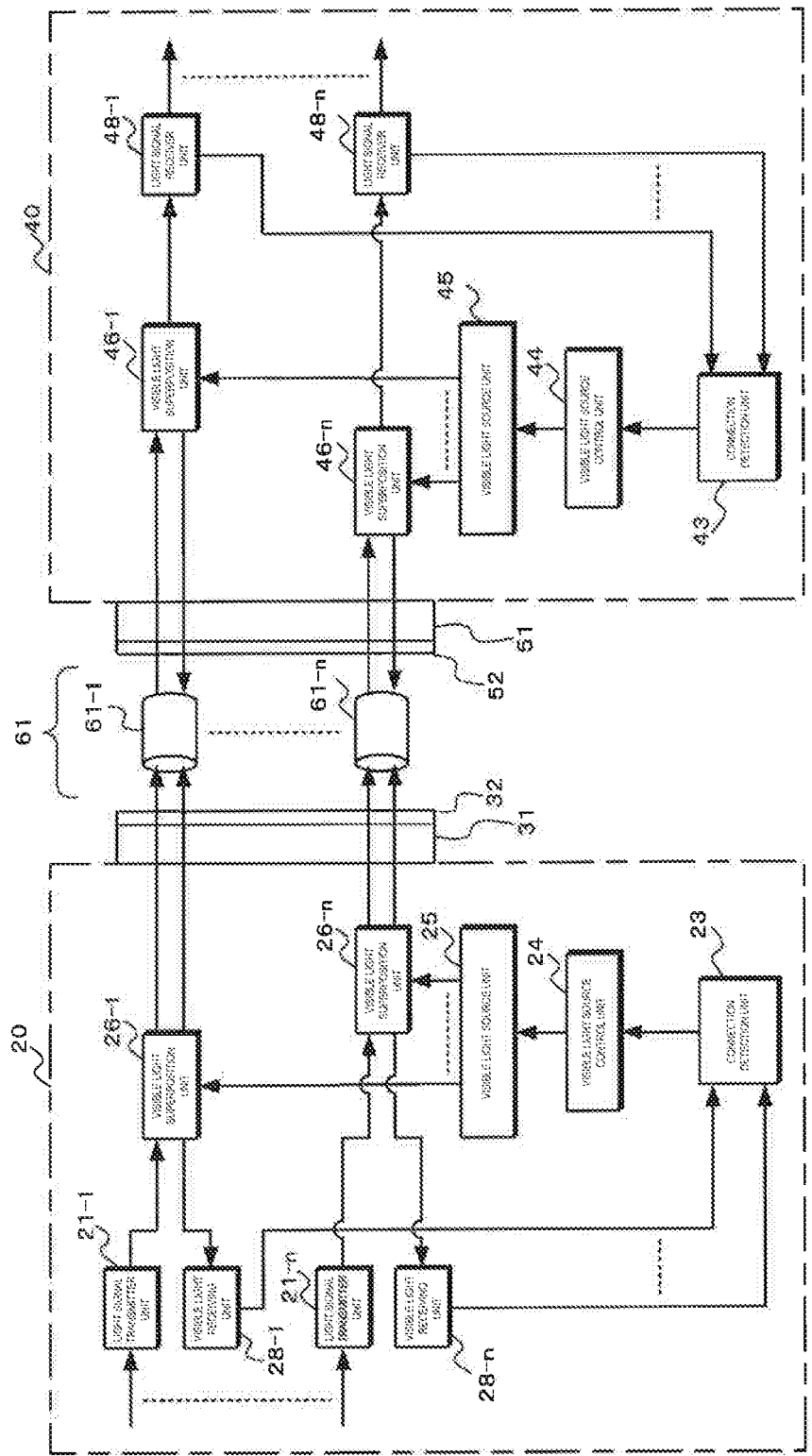
FIG. 6 is a diagram illustrating a configuration of a second embodiment.

FIG. 6 illustrates a configuration of the second embodiment. Note that FIG. 6 illustrates blocks relevant to a process that uses the optical transmission path, in the transmitter device 20 and the receiver device 40. Also, in an illustrated case, the transmitter device 20 and the receiver device 40 use, as the optical transmission path, the optical interface cable 61 in which n lines of optical fiber cables 61-1 to 61-n are bundled into one, and optical connectors are provided at cable end portions, for example.

The transmitter device 20 includes light signal transmitter units 21-1 to 21-n, a connection detection unit 23, a visible light source control unit 24, a visible light source unit 25, visible light superposition units 26-1 to 26-n, visible light receiving units 28-1 to 28-n, an optical connector 31, and a function display portion 32.

The light signal transmitter unit 21-1 generates a light signal on the basis of transmission data and outputs the light signal to the visible light superposition unit 26-1. In the same way, the light signal transmitter units 21-2 to 21-n generate a light signal on the basis of the transmission data and output the light signal to the visible light superposition units 26-2 to 26-n.

The connection detection unit 23 detects whether the transmitter device 20 and the receiver device 40 are connected via the optical interface cable 61. For example, the transmission of the visible light is performed through the optical fiber cable 61-1, and whether connection is established via the optical fiber cable 61-1 is detected on the basis of whether or not the visible light is received by the visible light receiving unit 28-1 described later. Also, the connection may be detected in the same way by using other optical fiber cables 61-2 to 61-n. The connection detection unit 23 outputs the detection information indicating the detection result, to the visible light source control unit 24.

The visible light source control unit 24 generates the visible light source control signal on the basis of the detection information from the connection detection unit 22, and outputs the visible light source control signal to the visible light source unit 25. The visible light source control unit 24 determines the connection to the receiver device 40 via the optical interface cable 61 on the basis of the detection information. The visible light source control unit 24 determines that the connection is not established to the receiver device 40 via the optical interface cable 61, when the connection via a predetermined optical fiber cable is not detected, or when the number of optical fiber cables in which the connection is not detected reaches a predetermined number, on the basis of the detection information. Also, when determining that connection is not established to the receiver device 40 via the optical interface cable 61, the visible light source control unit 24 generates a visible light source control signal in such a manner that the visible light that makes identifiable, by the attribute, the connection relationship with the receiver device 40 connected via the optical interface cable 61 is emitted from the visible light source unit 25. Also, the visible light source control unit 24 generates the visible light source control signal in such a manner that the visible light is superposed on all optical fiber cables or an arbitrary number of optical fiber cables that compose the optical interface cable that is determined to be unconnected.

The visible light source unit 25 emits the visible light that makes the connection relationship identifiable by the attribute, to the visible light superposition unit provided corresponding to the optical interface cable that is determined to be unconnected, on the basis of the visible light source control signal. For example, the visible light source unit 25 emits the visible light of the color that is the same as the color set in the function of the receiver device 40 connected via the determined optical interface cable.

The visible light superposition unit 26-1 is connected to the optical connector (for example, a receptacle) 31. The visible light superposition unit 26-1 superposes the visible light emitted from the visible light source unit 25, on the optical fiber cable 61-1 that is used in the transmission of the light signal generated by the light signal transmitter unit 21-1. In the same way, the visible light superposition units 26-2 to 26-n superpose the visible light emitted from the visible light source unit 25, on the optical fiber cables 61-2 to 61-n that are used in the transmission of the light signal generated by the light signal transmitter units 21-2 to 21-n.

When receiving the visible light from the receiver device 40 via the optical fiber cable 61-1, the visible light receiving unit 28-1 reports the light reception of the visible light to the connection detection unit 23. In the same way, when receiving the visible light from the receiver device 40 via the optical fiber cables 61-2 to 61-n, the visible light receiving units 28-2 to 28-n report the light reception of the visible light to the connection detection unit 23.

The optical connector 31 is connected to the optical connector (for example, the plug) provided in an optical fiber array composed of n lines of the optical fiber cables 61-1 to 61-n. The optical connector 31 causes the light signal from the visible light superposition unit 26-1 to enter into the optical fiber cable 61-1. In the same way, the optical connector 31 causes the light signal from the visible light superposition units 26-2 to 26-n to enter into the optical fiber cables 61-2 to 61-n.

The function display portion 32 presents a display that makes identifiable the light communication function performed via the optical connector 31. For example, the function display portion 32 is provided at the vicinity position of the optical connector 31, and presents color display indicating that the optical connector 31 is a connector that has a transmission function.

The receiver device 40 includes a connection detection unit 43, a visible light source control unit 44, a visible light source unit 45, visible light superposition units 46-1 to 46-n, light signal receiver units 48-1 to 48-n, an optical connector 51, and a function display portion 52.

The connection detection unit 43 detects whether the transmitter device 20 and the receiver device 40 are connected via the optical interface cable 61. For example, whether connection is established via the optical fiber cable 61-1 is detected on the basis of whether or not the light signal is received by the light signal receiver unit 48-1 that receives the light signal from the optical fiber cable 61-1. Also, the connection is detected in the same way, with respect to other optical fiber cables 61-2 to 61-n. The connection detection unit 43 outputs the detection information indicating the detection result, to the visible light source control unit 44.

The visible light source control unit 44 generates the visible light source control signal on the basis of the detection information from the connection detection unit 43, and outputs the visible light source control signal to the visible light source unit 45. The visible light source control unit 44 determines the connection to the transmitter device 20 via the optical interface cable 61 on the basis of the detection information. The visible light source control unit 44 determines that the connection is not established to the transmitter device 20 via the optical interface cable 61, when the connection via a predetermined optical fiber cable is not detected, or when the number of optical fiber cables in which the connection is not detected reaches a predetermined number, on the basis of the detection information. Also, when determining that connection is not established to the transmitter device 20 via the optical interface cable 61, the visible light source control unit 44 generates the visible light source control signal in such a manner that the visible light that makes identifiable, by the attribute, the connection relationship with the transmitter device 20 connected via the optical interface cable 61 is emitted from the visible light source unit 45. Also, the visible light source control unit 44 generates the visible light source control signal in such a manner that the visible light is superposed on all optical fiber cables or an arbitrary number of optical fiber cables that compose the optical interface cable that is determined to be unconnected.

The visible light source unit 45 emits the visible light that makes the connection relationship identifiable by the attribute, to the visible light superposition unit provided corresponding to the optical interface cable that is determined to be unconnected, on the basis of the visible light source control signal. For example, the visible light source unit 45 emits the visible light of the color that is the same as the color set in the function of the transmitter device 20 connected via the determined optical interface cable.

The visible light superposition unit 46-1 is connected to the optical connector (for example, a receptacle) 51. The visible light superposition unit 46-1 superposes the visible light emitted from the visible light source unit 45, on the optical fiber cable 61-1 that is used in the transmission of the light signal that is received by the light signal receiver unit 47-1. In the same way, the visible light superposition units 46-2 to 46-n superpose the visible light emitted from the visible light source unit 45, on the optical fiber cables 61-2 to 61-n that are used in the transmission of the light signals that are received by the light signal receiver units 47-2 to 47-n.

The light signal receiver unit 48-1 performs a photoelectric conversion process or the like to the light signal from the visible light superposition unit 46-1, and generates reception data. Also, when receiving the light signal, the light signal receiver unit 48-1 reports the reception of the light signal to the connection detection unit 43. In the same way, the light signal receiver units 48-2 to 48-n perform the photoelectric conversion process or the like to the light signals from the visible light superposition units 46-2 to 46-n, and generate reception data. Also, when receiving the light signal, the light signal receiver units 48-2 to 48-n report the reception of the light signal to the connection detection unit 43.

The optical connector (for example, a receptacle) 51 is connected to an optical connector (not illustrated in the drawings, and for example a plug) provided in the optical fiber array composed of n lines of the optical fiber cables 61-1 to 61-n.

The optical connector 51 emits the light signal from the optical fiber cable 61-1, to the visible light superposition unit 46-1. In the same way, the optical connector 51 emits the light signals from the optical fiber cables 61-2 to 61-n, to the visible light superposition units 46-2 to 46-n.

The function display portion 52 presents a display that makes identifiable the light communication function performed via the optical connector 51. For example, the function display portion 52 is provided at the vicinity position of the optical connector 51, and presents a color display indicating that the optical connector 51 is a connector that has a reception function.

<3-2. Operation of Second Embodiment>

The visible light source control unit of the transmitter device and the receiver device of the second embodiment performs the operation illustrated in the flowchart of FIG. 3 in the same way as the first embodiment. Also, in the second embodiment, the connection is confirmed by utilizing the optical transmission path, and thus the optical transmission result via the optical transmission path is utilized in the connection confirmation in step ST2 of FIG. 3. For example, in the transmitter device 20, the connection detection unit 23 detects the connection of the receiver device 40 and the transmitter device 20, by the light reception result of the visible light via the optical fiber cables 61-1 to 61-n in the visible light receiving units 28-1 to 28-n. The visible light source control unit 24 confirms whether or not the connection to the receiver device 40 is established, on the basis of the detection information generated by the connection detection unit 23, and proceeds to step ST3. Also, for example, in the receiver device 40, the connection detection unit 43 detects whether the transmitter device 20 and the receiver device 40 are connected via the optical transmission path, on the basis of the reception result of the light signal of the light signal receiver units 48-1 to 48-n. The visible light source control unit 44 confirms whether or not the connection to the transmitter device 20 is established, on the basis of the detection information generated by the connection detection unit 43, and proceeds to step ST3. The connection can be confirmed by utilizing the optical transmission path, by performing this process.

Also, the visible light source control unit 44 of the receiver device 40 performs the process that is the same as the visible light source control unit 24 of the transmitter device 20.

By performing this process, if the optical connector of the transmitter device is connected to the optical connector of the receiver device 40 corresponding to the function display portion of the color that is the same as the visible light emitted from this optical connector, the device can be connected easily and correctly even when the transmitter device 20 and the receiver device 40 are away from each other.

Also, anybody can simply perform connection work without improper connection, only by connecting the optical connector corresponding to the function display portion whose color is identical in the other device, with the color of the visible light superposed by one of the devices.

Also, the visible light is turned off when the transmitter device 20 and the receiver device 40 are connected, and thus bad influence of optical transmission performance due to the superposed visible light is eliminated, and intended transmission performance can be ensured.

Also, when the transmitter device 20 and the receiver device 40 are in the unconnected state, the visible light is emitted, and thus operation failure of the device, the optical connector, or the like, poor connection of the optical connector, and disconnection of the optical transmission path, and the like can be found easily before the connection. Also, even when the connection of the devices performed in the dark environment, the visible light is emitted from the optical connector, and thus the position of the optical connector of the optical transmission path and the optical connector of the device can be visually confirmed easily, and workability can be improved.

Also, the visible light emitted from the optical connector is prevented from giving bad influence to the visual perception function or the like, by emitting the non-laser light from the visible light source units 25, 45. Also, the visible light is diffused and emitted from the optical connector, by using the non-laser light, and thus color confirmation or the like can be performed easily.

Further, the connection of the transmitter device 20 and the receiver device 40 is detected by utilizing the optical transmission path, and thus the transmission path that differs from the optical transmission path is needless to be used.

<3-3. Another Configuration and Operation of Second Embodiment>

The above transmitter device of the second embodiment confirms the connection to the receiver device on the basis of whether or not the visible light from the receiver device is received via the optical transmission path, but the confirmation of the connection utilizing the optical transmission path may be performed by using other methods.

Figure 7:
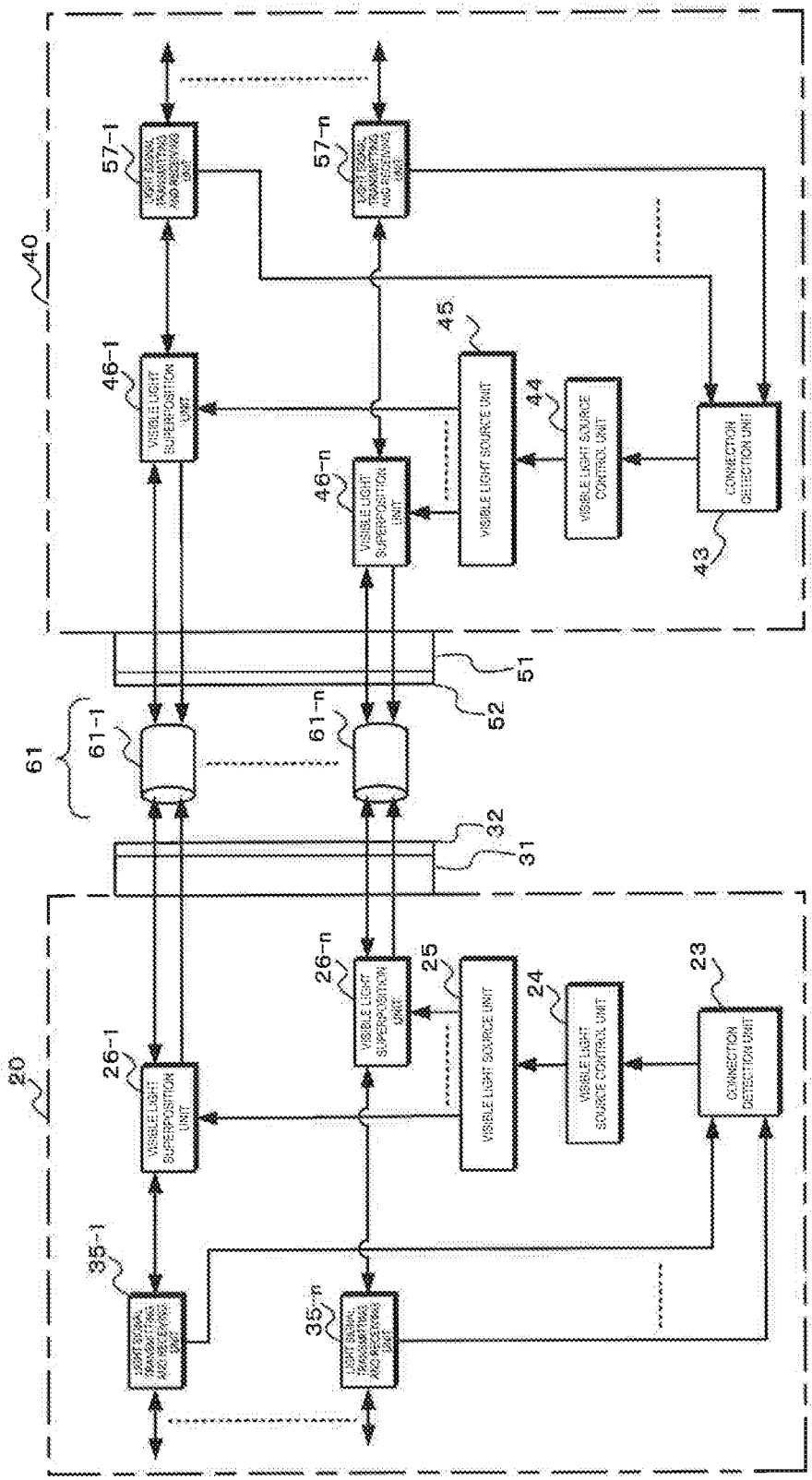
FIG. 7 is a diagram illustrating another configuration of the second embodiment.

For example, the transmitter device 20 uses light signal transmitting and receiving units 35-1 to 35-n, instead of the light signal transmitter unit, as illustrated in FIG. 7. Also, the receiver device 40 uses light signal transmitting and receiving units 57-1 to 57-n, instead of the light signal receiver unit.

The light signal transmitting and receiving unit 35-1 of the transmitter device 20 generates a light signal on the basis of the transmission data, and outputs the light signal to the visible light superposition unit 26-1. Also, when receiving an acknowledgement signal in response to the transmitted light signal, the light signal transmitting and receiving unit 35-1 reports the reception of the acknowledgement signal to the connection detection unit 23. In the same way, the light signal transmitting and receiving units 35-2 to 35-n of the transmitter device 20 generate light signals on the basis of the transmission data, and outputs the light signals to the visible light superposition units 26-2 to 26-n. Also, when receiving the acknowledgement signals in response to the transmitted light signals, the light signal transmitting and receiving units 35-2 to 35-n report the reception of the acknowledgement signals to the connection detection unit 23.

The connection detection unit 23 detects whether the transmitter device 20 and the receiver device 40 is connected via the optical transmission path. For example, when the reception of the acknowledgement signal is reported from the light signal transmitting and receiving units 35-1 to 35-n, the connection detection unit 23 detects the connection to the receiver device, and outputs the detection information indicating the detection result, to the visible light source control unit 24.

The light signal transmitting and receiving unit 57-1 of the receiver device 40 performs the photoelectric conversion process or the like to the light signal from the visible light superposition unit 46-1, and generates reception data. Also, when receiving the light signal, the light signal transmitting and receiving unit 57-1 reports the reception of the light signal to the connection detection unit 43. Further, the light signal transmitting and receiving unit 57-1 outputs the acknowledgement signal in response to the received light signal, from the visible light superposition unit 46-1 to the optical fiber cable 61-1. In the same way, the light signal transmitting and receiving units 57-2 to 57-n of the receiver device 40 perform the photoelectric conversion process or the like to the light signals from the visible light superposition units 46-2 to 46-n, and generate the reception data. Also, when receiving the light signal, the light signal transmitting and receiving units 57-2 to 57-n reports the reception of the light signal to the connection detection unit 43. Further, the light signal transmitting and receiving units 57-2 to 57-n outputs the acknowledgement signals in response to the received light signals, from the visible light superposition units 46-2 to 46-n to the optical fiber cables 61-2 to 61-n.

The connection detection unit 43 detects whether the transmitter device 20 and the receiver device 40 are connected via the optical transmission path. For example, when the reception of the light signal is reported from the light signal transmitting and receiving units 57-1 to 57-n, the connection detection unit 43 detects that the connection is established to the transmitter device, and outputs the detection information indicating the detection result, to the visible light source control unit 44.

The visible light source control unit in the transmitter device 20 and the receiver device 40 of this configuration performs the operation illustrated in the flowchart of FIG. 3 in the same way as the first embodiment. Also, in another second embodiment, in the connection confirmation of step ST2 in FIG. 3, the connection detection unit 23 of the transmitter device 20 detects the connection of the transmitter device 20 and the receiver device 40, by the reception result of the acknowledgement signal in the light signal transmitting and receiving units 35-1 to 35-n. The visible light source control unit 24 confirms whether or not the connection to the receiver device 40 is established, on the basis of the detection information generated by the connection detection unit 23. Also, in the receiver device 40, the connection detection unit 43 detects whether the transmitter device 20 and the receiver device 40 are connected via the optical transmission path, by the reception result of the light signal of the light signal transmitting and receiving units 57-1 to 57-n, and generates the detection information indicating the detection result. The visible light source control unit 44 confirms whether or not the connection to the transmitter device 20 is established, on the basis of the detection information generated by the connection detection unit 43. Also, the light signal transmitting and receiving unit of the receiver device 40 outputs the acknowledgement signal to the transmitter device 20.

When this process is performed, if the transmitter device 20 and the receiver device 40 are not connected, the transmitter device 20 superposes, on the optical transmission path, the visible light that matches the color of the function display portion corresponding to the optical connector of the connection target in the receiver device 40. Also, in the receiver device 40, the visible light that matches the color of the function display portion corresponding to the optical connector of the connection target in the transmitter device 20 is superposed on the optical transmission path.

Thus, if the optical connector of the transmitter device 20 is connected to the optical connector of the receiver device 40 corresponding to the function display portion of the color that is the same as the visible light emitted from this optical connector, the device can be connected easily and correctly, even when the transmitter device 20 and the receiver device 40 are away from each other.

Also, anybody can simply perform connection work without improper connection, only by connecting the optical connector corresponding to the function display portion whose color is identical in the other device, with the color of the visible light superposed by one of the devices.

Also, the visible light is turned off when the transmitter device 20 and the receiver device 40 are connected, and thus the visible light is not superposed in any case on the optical transmission path to which the transmitter device 20 and the receiver device 40 are connected. Thus, when the optical communication is performed between the transmitter device 20 and the receiver device 40, bad influence that arises due to the superposed visible light is prevented.

Further, the visible light source control unit of the transmitter device 20 and the receiver device 40 may perform the operation illustrated in the flowchart of FIG. 5 in the same way as the first embodiment. In the connection confirmation of step ST12 in the second embodiment, the connection detection unit 23 of the transmitter device 20 detects whether the transmitter device 20 and the receiver device 40 are connected via the optical transmission path, on the basis of the reception result of the acknowledgement signal in the light signal transmitting and receiving units 35-1 to 35-n. The visible light source control unit 24 confirms whether or not the connection to the receiver device 40 is established, on the basis of the detection information generated by the connection detection unit 23. Also, in the receiver device 40, the connection detection unit 43 detects whether the transmitter device 20 and the receiver device 40 are connected via the optical transmission path, on the basis of the reception result of the light signal of the light signal transmitting and receiving units 57-1 to 57-n, and generates the detection information indicating the detection result. The visible light source control unit 44 confirms whether or not the connection to the transmitter device 20 is established, on the basis of the detection information generated by the connection detection unit.

Also, in the connection confirmation of step ST16 in the second embodiment, the connection detection unit 23 of the transmitter device 20 detects the connection on the basis of whether or not the acknowledgement signal in response to the light signal transmitted to the receiver device 40 is received by the light signal transmitting and receiving unit. The visible light source control unit 24 confirms whether or not the connection to the receiver device 40 is established, on the basis of the detection information generated by the connection detection unit 23. Also, the connection detection unit 43 of the receiver device 40 generates the detection information, depending on whether or not the light signal is received by the light signal transmitting and receiving units 57-1 to 57-n. The visible light source control unit 44 confirms whether or not the connection to the transmitter device 20 is established, on the basis of the detection information generated by the connection detection unit 43.

In this way, the connection can be confirmed by utilizing the optical transmission path. Also, when the transmitter device and the receiver device change from the connected state to the unconnected state and the transmission and reception of the light signal is stopped, the visible light that makes identifiable, by the color, the connection relationship with the device that is connected via the optical transmission path is emitted, and thus the optical transmission path that has become the unconnected state can be returned to the connected state correctly with reference to the color of the emitted visible light. Also, the visible light is in the blinking state, and thus the optical transmission path of the connected state can be determined to be in the unconnected state.

Also, when the direction of the light signal in the optical transmission path is one direction, the connection confirmation may be performed by using the optical transmission path through which the light signal is transmitted from the transmitter device to the receiver device and the optical transmission path through which the light signal is transmitted from the receiver device to the transmitter device. If the optical transmission path is used as described above, the visible light corresponding to the optical transmission path can be emitted when the transmitter device and the receiver device change from the connected state to the unconnected state. In this case, for example, the connection detection unit of the transmitter device 20 detects the connection of the transmitter device 20 and the receiver device 40, by the reception result of the light signal receiver unit, for example the reception result of the acknowledgement signal in response to the light signal that is transmitted from the light signal transmitter unit, and generates the detection information indicating the detection result. The visible light source control unit confirms whether or not the connection to the receiver device 40 is established, on the basis of the detection information generated by the connection detection unit. Also, in the receiver device 40, the connection detection unit detects whether the transmitter device 20 and the receiver device 40 are connected via the optical transmission path, on the basis of the reception result of the light signal of the light signal receiver unit, and generates the detection information indicating the detection result. The visible light source control unit confirms whether or not the connection to the transmitter device 20 is established, on the basis of the detection information generated by the connection detection unit.

When this process is performed, the transmitter device 20 and the receiver device 40 can determine whether in the connected state or in the unconnected state, even when the direction of the light signal in the optical transmission path is one direction. Thus, if the visible light is emitted on the basis of the determination result, the optical transmission path that has become the unconnected state can be returned to the connected state correctly with reference to the color of the emitted visible light. Also, the visible light is in the blinking state, and thus the optical connector in the unconnected state can be recognized easily, and therefore reconnection is performed simply. Note that, when the light signal receiver unit or the like is provided in the transmitter device and the receiver device is provided in the light signal transmitter unit or the like in order to perform bidirectional communication, when the optical transmission paths for the transmission side and the reception side are different, the visible light receiving unit illustrated in FIG. 6 is needless to be provided.

Also, the optical transmission path in the second embodiment is not limited to the optical interface cable composed by using a plurality of lines of optical fiber cables, but may be an optical interface cable configured with one optical fiber cable. Also, the optical transmission path is not limited to one optical interface cable, but a plurality of optical interface cables may be used. Also, the optical transmission path is not limited to the optical interface cable, but may use an optical waveguide or the like.

Also, when the optical transmission path is an optical interface cable that is configured by using a plurality of lines of optical fiber cables, the visible light is superposed on the optical fiber cable that is used in the optical communication of the communication unit of at least any of a plurality of communication units connected by the optical connector, only when the optical connector is in the unconnected state. In this way, the transmitter device 20 and the receiver device 40 can be connected easily and correctly by the optical transmission path. Also, when the visible light is superposed on all optical fiber cables used in the optical communication of a plurality of communication units connected by the optical connector, the optical fiber cable in which poor connection and disconnection arise can be detected easily at each connector before connection.

<4. Another Embodiment>

In the above embodiment, a case has been described in which the visible lights of the color corresponding to the transmission function and the color corresponding to the reception function are superposed on the optical transmission path, as the visible light that makes identifiable, by the attribute, the connection relationship with the device that is connected via the optical transmission path. However, the attribute of the visible light is not limited to the color, but a light emission pattern or the like, for example a ratio of a lighting-up period and a turning-off period, the number of light emission pulses within a predetermined period or the like may be used. For example, the transmitter device 20 superposes the visible light of a first light emission pattern on the optical transmission path that is connected to the receiver device 40. Also, the receiver device 40 connected to the transmitter device 20 superposes the visible light of the first light emission pattern on the optical transmission path that is connected to the transmitter device 20. When the visible light is superposed as described above, the transmitter device and the receiver device can be connected correctly, by connecting the optical connector (for example, the receptacle and the plug) of the identical light emission pattern. Also, a plurality of transmission functions (for example, the transmission functions of a plurality of light signals of different formats or the like) are provided in the transmitter device, and a plurality of reception functions corresponding to a plurality of transmission functions are provided in the receiver device. In this case, when the transmission function is a first color and the reception function is a second color, it is concerned that the optical transmission path on which the visible light of the second color is superposed is connected to the optical connector of the reception function that does not correspond to the transmission function of the transmitter device. However, if the same light emission pattern or the like is set in each of the transmission function and the reception function corresponding to this transmission function, a plurality of transmission functions and the reception functions are provided in the devices, and the devices can be connected correctly on the basis of the color, the issuance pattern, or the like of the visible light. Also, when the color is used as the attribute of the visible light, the same color or the like may be set for each of the transmission function and the reception function corresponding to this transmission function. As described above, when the optical connectors (for example, the receptacle and the plug) in which the visible light of the same light emission pattern is superposed, or the optical connectors in which the visible light of the same color is superposed, are connected to each other, the devices can be connected easily and correctly, even when the function display portion is unable to be determined.

Figure 8:
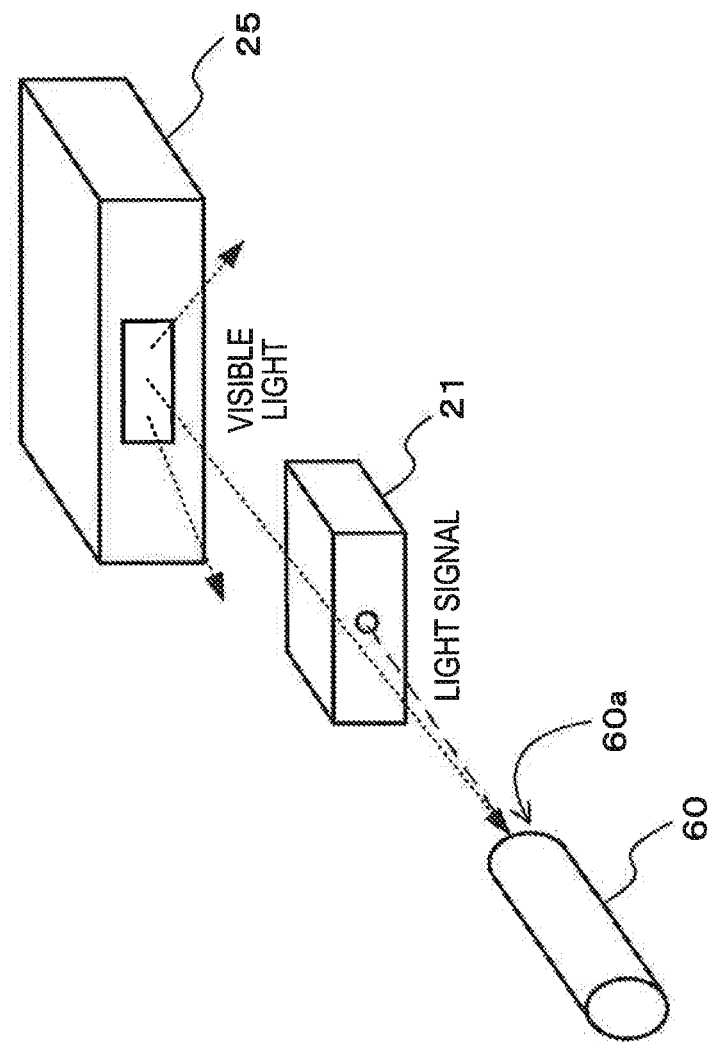
FIG. 8 is a diagram illustrating a configuration that superposes visible light on an optical transmission path.

Also, when the visible light is superposed on the optical transmission path, a case that uses a light synthesis element such as a prism is not limitation, but the visible light of non-laser light is radiated on an end surface of the optical transmission path. For example, as illustrated in FIG. 8, the visible light source unit 25 may be provided in such a manner that the visible light is radiated on the entrance surface 60a of the optical transmission path 60 into which the light signal from the light signal transmitter unit 21 enters. With this configuration, the visible light can be superposed without using the light synthesis element or the like. Also, the visible light can easily enter into the optical transmission path, by using the non-laser light as the visible light.

Also, the above embodiment describes a case in which the transmitter device and the receiver device are connected by the optical transmission path, but may be applied to a case in which the transmission block and the reception block of the light signal provided in the device are connected by the optical transmission path as the communication target.

The present technology is not interpreted as being limited to the above-described embodiments of the technology. The embodiments of the technology disclose the present technology in the form of exemplification, and it is obvious that a person skilled in the art can make modification or substitution of the embodiments without departing from the gist of the present technology. In other words, in order to determine the gist of the present technology, the claims should be considered.

Additionally, an optical communication device according to the present technology may also be configured as below.

(1)

An optical communication device including:

a communication unit configured to perform optical communication with a communication target via an optical transmission path;

a connection detection unit configured to detect connection between the communication unit and the communication target via the optical transmission path and generate detection information;

a visible light source unit configured to emit visible light;

a visible light superposition unit configured to superpose the visible light emitted from the visible light source unit on the optical transmission path; and a visible light source control unit configured to cause the visible light source unit to emit the visible light that makes identifiable, by an attribute, a connection relationship with the communication target that is connected via the optical transmission path, only when connection to the communication target is not detected on the basis of the detection information generated by the connection detection unit.

(2)

The optical communication device according to (1), wherein the visible light source control unit causes the visible light source unit to emit the visible light of the attribute indicating a reception function of a light signal, when a function of the communication unit is a transmission function of the light signal, and causes the visible light source unit to emit the visible light of the attribute indicating the transmission function of the light signal, when the function of the communication unit is the reception function of the light signal.

(3)

The optical communication device according to (2), further including:

a function display portion that makes the function of the communication unit identifiable, wherein the visible light source control unit causes the visible light source unit to emit the visible light of the attribute corresponding to the function display portion indicating the reception function of the light signal, when the function of the communication unit is the transmission function of the light signal, and causes the visible light source unit to emit the visible light of the attribute corresponding to the function display portion indicating the transmission function of the light signal, when the function of the communication unit is the reception function of the light signal.

(4)

The optical communication device according to (3), wherein the function display portion is provided in a vicinity of a connector for connecting the communication unit and the optical transmission path.

(5)

The optical communication device according to any of (1) to (4), wherein the visible light source control unit makes the connection relationship identifiable by a color of the visible light.

(6)

The optical communication device according to any of (1) to (5), wherein the visible light source control unit makes the connection relationship identifiable by a light emission pattern of the visible light.

(7)

The optical communication device according to any of (1) to (6), wherein when a plurality of the communication units are provided, and a connector establishes connection of the plurality of communication units together, the visible light source control unit causes the visible light to be superposed on the transmission path used in optical communication of at least any of the plurality of communication units connected by the connector.

(8)

The optical communication device according to (7), wherein the visible light source control unit causes the visible light to be superposed on all of the transmission paths used in the optical communication of the plurality of communication units connected by the connector.

(9)

The optical communication device according to any of (1) to (8), wherein the visible light source control unit causes the visible light source unit to emit the visible light in such a manner to make identifiable a change from a connected state to an unconnected state, when determining that the connection to the communication target changes from the connected state to the unconnected state, on the basis of the detection information generated by the connection detection unit.

(10)

The optical communication device according to any of (11) to (9), wherein the connection detection unit detects the connection to the communication target via the optical transmission path or a transmission path that differs from the optical transmission path.

(11)

The optical communication device according to any of (1) to (10), wherein the visible light source unit emits non-laser light.

INDUSTRIAL APPLICABILITY

In the optical communication device and the optical communication method of this technology, the connection via the optical transmission path between the communication unit that performs the optical communication and the communication target is detected, and only when the communication unit being connected to the communication target is not detected on the basis of the detection information indicating the detection result, the visible light that makes identifiable, by the attribute, the connection relationship with the communication target connected via the optical transmission path is emitted from the visible light source unit, and this visible light is superposed on the optical transmission path. Hence, the connection between the optical communication devices is correctly and easily established, by referring to the visible light superposed on the optical transmission path. Thus, for example, an optical communication system in which a transmitter device that transmits information such as video and audio content and computer data and a receiver device that receives and processes information such as the transmitted video and audio content and computer data are connected by an optical interface cable or the like is suitable.

REFERENCE SIGNS LIST 10 optical communication system
20 transmitter device
21, 21-1 to 21-n light signal transmitter unit
22, 23, 42, 43 connection detection unit
24, 44 visible light source control unit
25, 45 visible light source unit
26-1 to 26-n, 46-1 to 46-n visible light superposition unit
28-1 to 28-*n* visible light receiving unit
31, 51, 51*a*, 51*b*, 61*p*1, 61*p*2 optical connector
32, 52, 52*a*, 52*b* function display portion
35-1 to 35-n, 57-1 to 57-n light signal transmitting and receiving unit
40 receiver device
47-1 to 47-n, 48-1 to 48-n light signal receiver unit
60 optical transmission path
60*a* entrance surface
61 optical interface cable
61-1 to 61-n optical fiber cable

The invention claimed is:

1. An optical communication device comprising:
   a communication unit configured to perform optical communication with a communication target via an optical transmission path;
   a connection detection unit configured to detect connection between the communication unit and the communication target via the optical transmission path and generate detection information;
   a visible light source unit configured to emit visible light;
   a visible light superposition unit configured to superpose the visible light emitted from the visible light source unit on the optical transmission path; and
   a visible light source control unit configured to cause the visible light source unit to emit the visible light that makes identifiable, by an attribute of the visible light, a connection relationship with the communication target that is connected via the optical transmission path, only when connection to the communication target is not detected on the basis of the detection information generated by the connection detection unit,
   wherein the attribute of the visible light is associated with a function of the communication target.

2. The optical communication device according to claim 1, wherein
   the visible light source control unit causes the visible light source unit to emit the visible light of the attribute indicating a reception function of a light signal, when a function of the communication unit is a transmission function of the light signal, and causes the visible light source unit to emit the visible light of the attribute indicating the transmission function of the light signal, when the function of the communication unit is the reception function of the light signal.

3. The optical communication device according to claim 2, further comprising:
   a function display portion that makes the function of the communication unit identifiable,
   wherein the visible light source control unit causes the visible light source unit to emit the visible light of the attribute corresponding to the function display portion indicating the reception function of the light signal, when the function of the communication unit is the transmission function of the light signal, and causes the visible light source unit to emit the visible light of the attribute corresponding to the function display portion indicating the transmission function of the light signal, when the function of the communication unit is the reception function of the light signal.

4. The optical communication device according to claim 3, wherein
   the function display portion is provided in a vicinity of a connector for connecting the communication unit and the optical transmission path.

5. The optical communication device according to claim 1, wherein
   the visible light source control unit makes the connection relationship identifiable by a color of the visible light.

6. The optical communication device according to claim 1, wherein
   the visible light source control unit makes the connection relationship identifiable by a light emission pattern of the visible light.

7. The optical communication device according to claim 1, wherein
   when a plurality of communication units are provided, and a connector establishes connection of the plurality of communication units together,
   the visible light source control unit causes the visible light to be superposed on the optical transmission path used in optical communication of at least any of the plurality of communication units connected by the connector.

8. The optical communication device according to claim 7, wherein
   the visible light source control unit causes the visible light to be superposed on all optical transmission paths used in the optical communication of the plurality of communication units connected by the connector.

9. The optical communication device according to claim 1, wherein
   the visible light source control unit causes the visible light source unit to emit the visible light in such a manner to make identifiable a change from a connected state to an unconnected state, when determining that the connection to the communication target changes from the connected state to the unconnected state, on the basis of the detection information generated by the connection detection unit.

10. The optical communication device according to claim 1, wherein
    the connection detection unit detects the connection to the communication target via the optical transmission path or a transmission path that differs from the optical transmission path.

11. The optical communication device according to claim 1, wherein
    the visible light source unit emits non-laser light.

12. An optical communication method comprising:
    detecting, by a connection detection unit, connection between a communication unit that performs optical communication and a communication target via an optical transmission path, and generating detection information; and
    causing, by a visible light source control unit, a visible light source unit to emit visible light that makes identifiable, by an attribute of the visible light, a connection relationship with the communication target that is connected via the optical transmission path, only when the connection to the communication target is not detected on the basis of the detection information, and causing a visible light superposition unit to superpose the visible light on the optical transmission path,
wherein the attribute of the visible light is associated with a function of the communication target.

* * * * *